(12) United States Patent
Prakash et al.

(10) Patent No.: US 7,434,213 B1
(45) Date of Patent: Oct. 7, 2008

(54) PORTABLE EXECUTABLE SOURCE CODE REPRESENTATIONS

(75) Inventors: Raj Prakash, Saratoga, CA (US); Kurt J. Goebel, Dayton, OH (US); Fu-Hwa Wang, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 944 days.

(21) Appl. No.: 10/813,889

(22) Filed: Mar. 31, 2004

(51) Int. Cl.
*G06F 9/45* (2006.01)
(52) U.S. Cl. ...................................... 717/152
(58) Field of Classification Search ................... 717/152
See application file for complete search history.

(56) References Cited

U.S. PATENT DOCUMENTS

| 5,655,122 | A | 8/1997 | Wu |
| 5,778,212 | A | 7/1998 | Dehnert et al. |
| 2003/0126559 | A1* | 7/2003 | Fuhrmann .................... 715/513 |
| 2006/0158354 | A1* | 7/2006 | Aberg et al. ................... 341/50 |

OTHER PUBLICATIONS

Calingaert, Peter, "*Assemblers, Compilers, and Program Translation*", Ch. 7, pp. 182-232, University of North Carolina at Chapel Hill, Computer Science Press, Inc., 1979.

Appel, Andrew W., "*Modern Compiler Implementation in C*", Ch. 7, pp. 150-175, Cambridge University Press, 1998.

* cited by examiner

*Primary Examiner*—John Chavis
(74) *Attorney, Agent, or Firm*—Dorsey & Whitney LLP

(57) ABSTRACT

Platform independent processing of the source code is performed, such as lexical analysis, semantic analysis, syntax analysis, and platform independent optimization, and an intermediate representation of the source code is generated. This intermediate representation is carried forward into the next stage of processing, which is platform dependent processing. The intermediate representation undergoes machine specific analysis and an executable representation (i.e., executable code) of the source code for a particular platform is generated. However, the intermediate representation, which has not been converted to a machine specific representation, is included with the executable representation. The source code can essentially be ported to a different platform by extracting the intermediate representation and performing platform dependent processing on the intermediate representation. The extracted intermediate representation, which has already undergone platform independent processing, is processed for the target platform and an executable representation for the target platform is generated.

60 Claims, 12 Drawing Sheets

PORTABLE EXECUTABLE SOURCE CODE REPRESENTATIONS

CROSS-REFERENCE TO RELATED APPLICATION(S)

This non-provisional patent application is related to commonly-owned, co-pending U.S. patent application Ser. No. 09/895,445 entitled "Interprocedural Optimization Framework", filed on Jun. 29, 2001, naming Raj Prakash, Fu-Hwa Wang, and Chandrashekhar Garud as inventors, which is incorporated herein by reference in its entirety.

BACKGROUND

1. Field of the Invention

The present invention relates to the field of software. More specifically, the present invention relates to software portability.

2. Description of the Related Art

In general, compiling code involves front-end compiler tasks and back-end compiler tasks. Typically, front-end compiler tasks are platform independent tasks that analyze source code in accordance with the governing language. The back-end compiler tasks are typically platform dependent tasks that process the result of the front-end compiler tasks to generate an executable file for a target platform. For example, in a conventional configuration, a compiler is invoked for one or more source code files to generate an executable file. The compiler performs preprocessing, which includes macro substitution, inclusion of named files, and conditional compilation. After preprocessing, the compiler performs the front-end compiler tasks, which include lexical analysis, syntax analysis, and semantic analysis. During lexical analysis, the compiler breaks the source code into lexical tokens, which are passed to a parser. The parser performs syntax analysis and semantic analysis of the lexical tokens. Semantic analysis may include some platform independent optimizations. Upon completion of the front-end compiler tasks, the compiler generates an intermediate code that is equivalent to the source code. The compiler then performs the back-end compiler tasks with the intermediate code. Platform dependent optimizations are made to the intermediate code. Finally, the compiler translates the optimized intermediate code into the machine language of the target platform.

If an application will be provided for different platforms, then typically the source code of the application is compiled for each target platform. The executable code is not itself suitable for execution on differing platforms and the executable code does not include information sufficient to allow compilation or re-compilation of executable code for a new target platform. As a result, an end-user cannot recompile their application to take advantage of a newer platform and/or migrate to a different platform without the source code. Accordingly, a technique is desired that better facilitates portability of executable code.

SUMMARY OF THE INVENTION

Including an intermediate representation of source code with an executable representation of the source code enables portability of code regardless of the availability of the source code. Maintaining one or more intermediate representations of source code with the executable representation together as a portable executable source code representation allows the intermediate representations to be maintained in a single file. Maintaining the intermediate representations in a single file facilitates porting of an application across platforms without the hassle of maintaining multiple files.

Platform independent processing of the source code is performed, such as lexical analysis, semantic analysis, syntax analysis, and platform independent optimization, and an intermediate representation of the source code is generated. This intermediate representation is carried forward into the next stage of processing, which is platform dependent analysis. The intermediate representation undergoes machine specific analysis and conversion to the executable representation (i.e., executable code) of the source code for a particular platform. However, the intermediate representation, which has not been converted to a machine specific representation, is included with the executable representation in a portable executable representation. Later, the code can be ported to a different platform by extracting the intermediate representation from the portable executable representation. The extracted intermediate representation, which has already undergone platform independent processing, is processed for the target platform and an executable representation for the target platform is generated for the target platform. Hence, even though the source or object code may be lost or unavailable, the portable executable representation carries an intermediate representation that allows for portability of the source code across platforms.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 7A depicts an exemplary compiler front-end module and interprocedural optimizer analyzing source code and generating intermediate representations of the source code. FIG. 7B depicts an exemplary interprocedural optimizer preserving intermediate representations of source code.

FIG. 8A depicts an exemplary portable executable source code representation. FIG. 8B depicts exemplary re-linking of object files with a portable executable source code representation.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. For instance, realizations of the invention are described with reference to compilers, but other source code processing modules, such as interpreters, virtual machines, translators, etc., may incorporate software portability functionality. It is understood that the described invention may be practiced without these specific details. In other instances, well-known protocols, structures and techniques have not been shown in detail in order not to obscure the invention. For instance, a compiler may operate differently than illustrated herein.

The term source code is used throughout the following description. The term source code is not limited to code written in a traditional high-level language, but includes any unit of code that is the source for another code unit. In other words, source code describes a code unit that can be translated, compiled, interpreted, optimized, etc., thus generating one or more other code units, whether those other code units are separate from the source code unit, the source code as modified, embedded into the source code, etc.

Figure 1A:
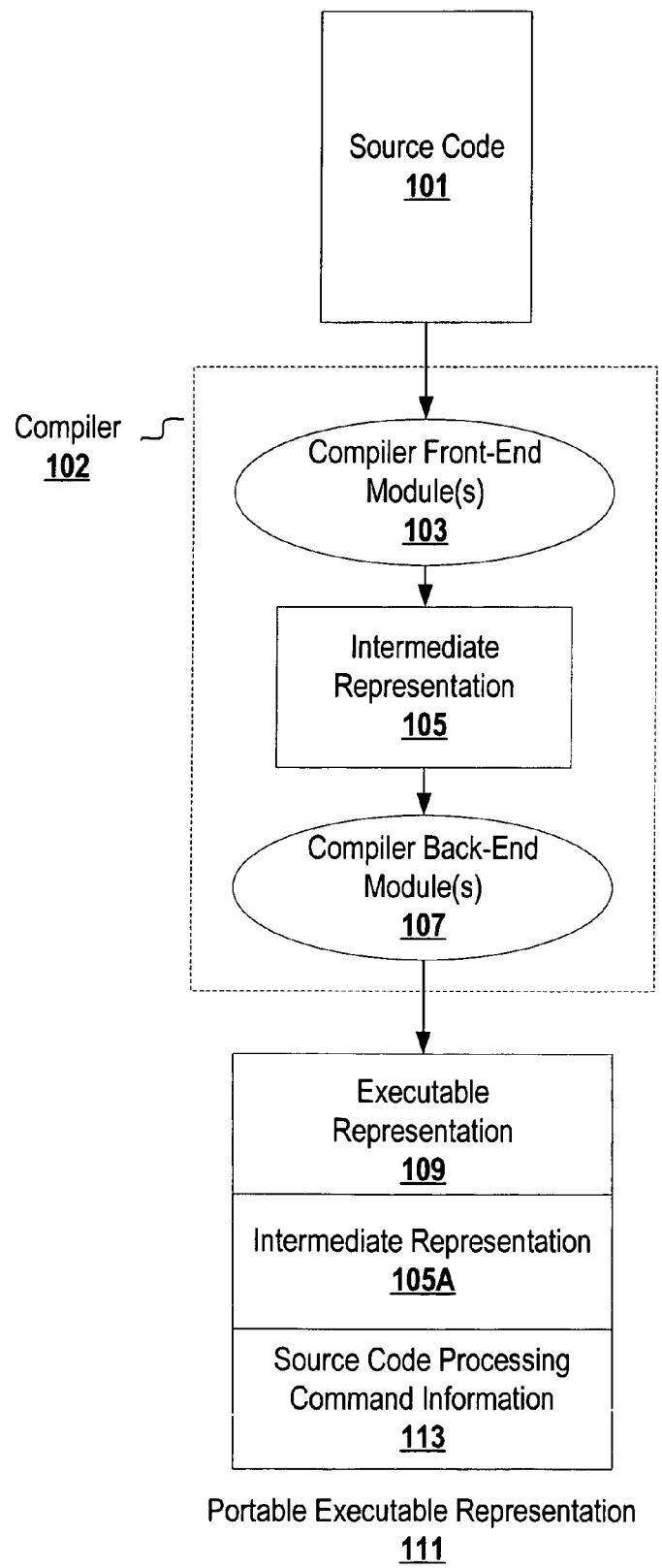
FIG. 1A depicts an exemplary compiler compiling source code and generating a portable executable representation of the source code.

FIG. 1A depicts an exemplary compiler compiling source code and embedding an intermediate representation of the source code. A compiler 102 receives a source code 101 (e.g., code written in C, C++, Fortran, COBOL, Java®, etc.). Java and all Java-based marks and logos are trademarks or registered trademarks of Sun Microsystems, Inc. in the United States and other countries. The compiler 102 includes compiler front-end module 103 and compiler back-end module 107. The compiler front-end module 103 performs platform-independent processing of the source code 101. For example, the compiler front-end module 103 performs syntax analysis, semantic analysis, and lexical analysis. The compiler front-end module 103 generates an intermediate representation 105 of the source code 101. The intermediate representation 105 may include one or more of symbol tables, object bindings, platform independent optimizations, etc. The compiler back-end module 107 performs platform specific processing of the intermediate representation 105, such as storage allocation and executable code generation for a target platform. The compiler back-end module 107 generates an executable representation 109 of the source code 101. The compiler 102 includes an intermediate representation 105A (typically the intermediate representation 105 or a corresponding subset, superset, or overlapping of information) with the executable representation 109 to generate a portable executable representation 111 (e.g., an executable file or image that includes executable code and the corresponding one or more intermediate representations). The portable executable representation 111 also includes source code processing command information 113 (e.g., compiler directives, compiler options, translator invocation commands, compiler flags, virtual machine options, etc.) for generation of another executable representation. Although in FIG. 1A the compiler 102 generates the portable executable representation 111 with the intermediate representation 105A, generation of a portable executable representation may be performed subsequent to compiling, performed with tools separate from the compiler, etc., in various realizations of the invention.

Figure 1B:
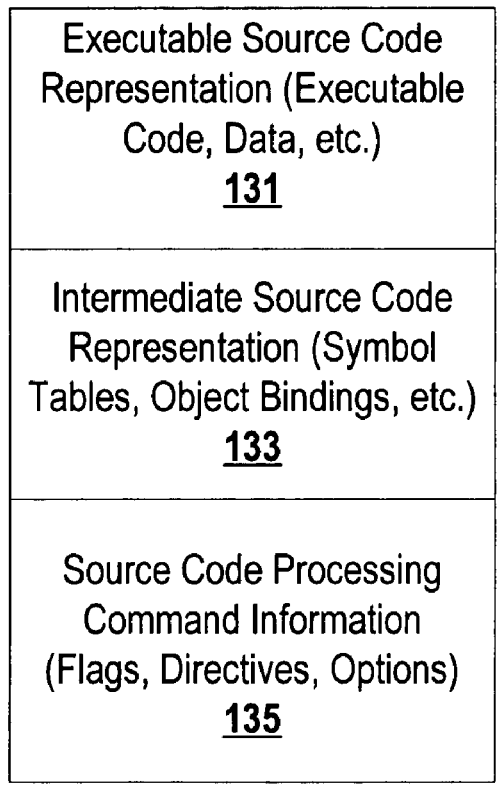
FIG. 1B depicts an exemplary portable executable source code representation according to some realizations of the invention.

FIG. 1B depicts an exemplary portable executable source code representation according to some realizations of the invention. A portable executable source code representation 141 includes an executable source code representation 131, an intermediate source code representation 133, and source code processing command information 135. The executable source code representation 131 includes executable code, data, etc. The intermediate source code representation includes object bindings, symbol tables, platform independent optimizations, etc., such as the intermediate representation of FIG. 1A. The source code processing command information includes compiler directives, flags, options, etc., entered when invoking a compiler to compile a corresponding source code.

Figure 2:
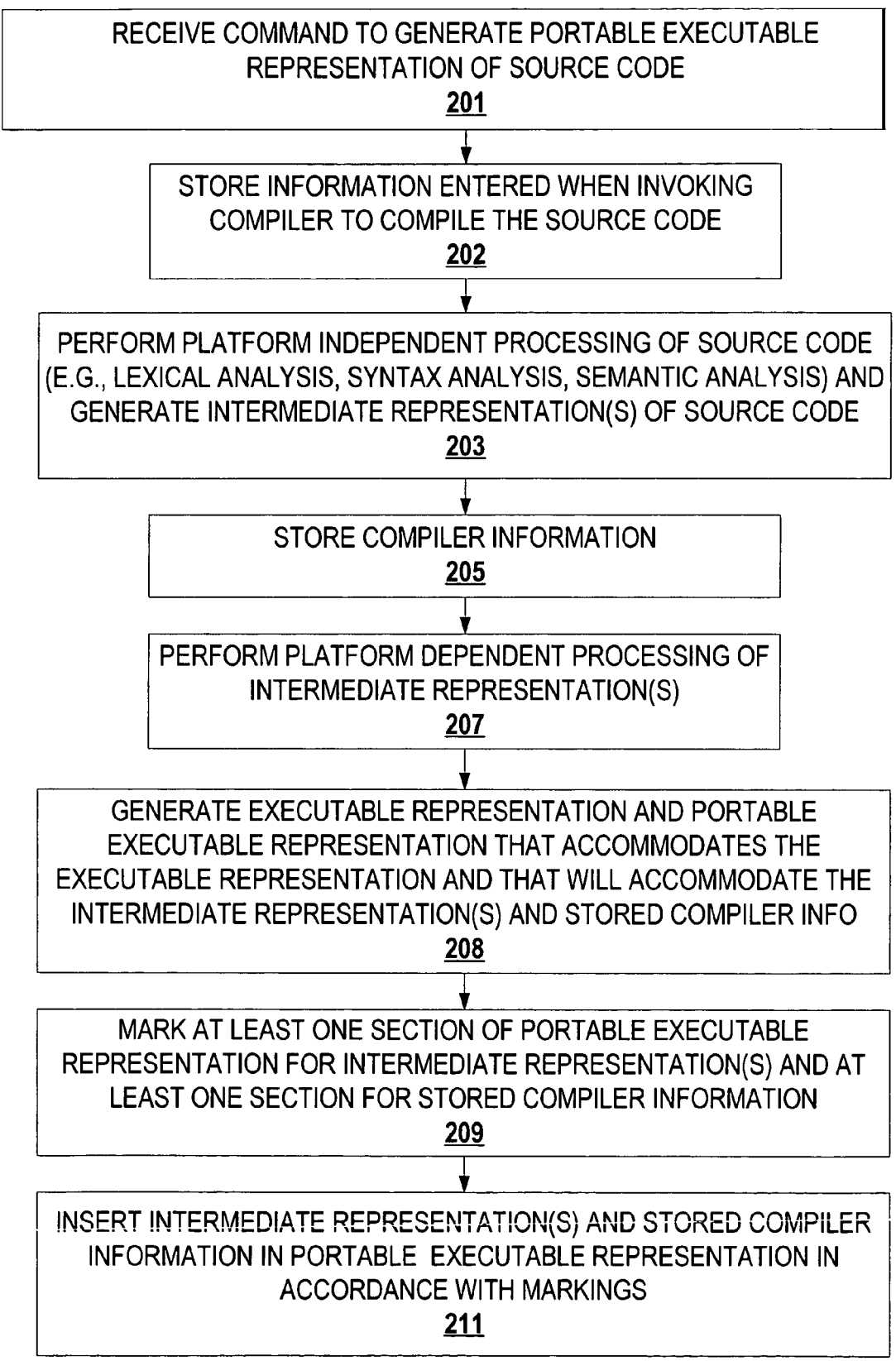
FIG. 2 depicts an exemplary flowchart for including an intermediate representation of source code with an executable representation of source code.

FIG. 2 depicts an exemplary flowchart for including an intermediate representation of source code with an executable representation of source code. At block 201, a command to generate a portable executable representation is received (e.g., by a compiler). At block 202, compiler information (e.g., compiler directives, flags, options, etc.) entered when invoking a compiler to compile a source code are stored. At block 203, platform independent processing of the source code is performed (e.g., lexical analysis, semantic analysis, syntax analysis), and an intermediate representation(s) of the source code is generated. At block 205, the compiler information is stored (e.g., included with the intermediate representation of the source code, stored separately, etc.). Various realizations carry forward compiler information differently (e.g., store the information at a location to be accessed by the compiler to determine space for intermediate representations; included in a header of at least one of the intermediate representations; embedded into a reserved or marked section of a portable executable representation, etc.). At block 207, platform dependent processing of the intermediate representation is performed, and an executable representation of the source code for the target platform is generated. At block 208, an executable representation of the source code is generated, and a portable executable representation that accommodates the executable representation and that will accommodate the intermediate representation(s) and the stored compiler information is generated. For example, a compiler will acquire space sufficient to accommodate the intermediate representation, the executable representation, and the stored compiler information. At block 209, at least one section of the portable executable representation is marked for the intermediate representation(s) and at least one section is marked for the stored compiler information. At block 211, the intermediate representation(s) and the stored compiler information is inserted into the portable executable representation in accordance with the one or more markings.

Figure 3:
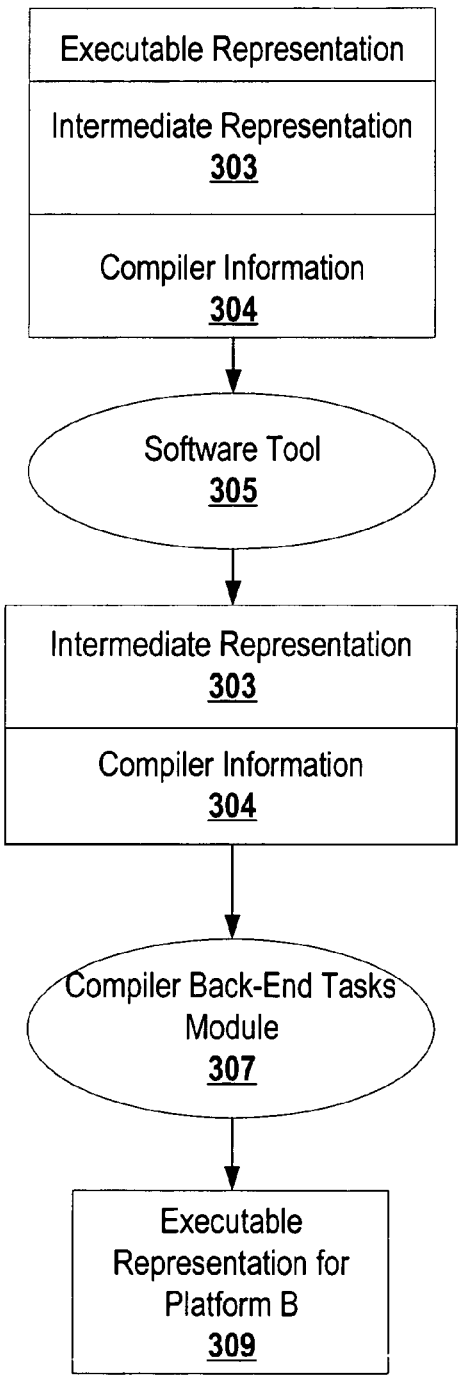
FIG. 3 depicts an exemplary software tool to port software across platforms with a portable executable source code representation.

FIG. 3 depicts an exemplary software tool to port software across platforms with a portable executable source code representation. A software tool 305 processes a portable executable source code representation 301 that includes an intermediate representation 303 of the source code and compiler information 304. The portable executable representation was compiled for a platform A (e.g., a particular processor, operating system, virtual machine, etc.). The software tool 305 extracts the intermediate representation 303 and the compiler information 304, and a back-end compiler tasks module 307 operates on the extracted intermediate representation 303 in accordance with the extracted compiler information 304. The back-end compiler tasks module processes the intermediate representation 303, and generates an executable representation 309 for a platform B. An additional module or the back-end compiler tasks module 307 may also carry forward the intermediate representation 303 from the executable representation 301 and include it with the executable representation 309 to generate another portable executable source code representation.

Figure 4:
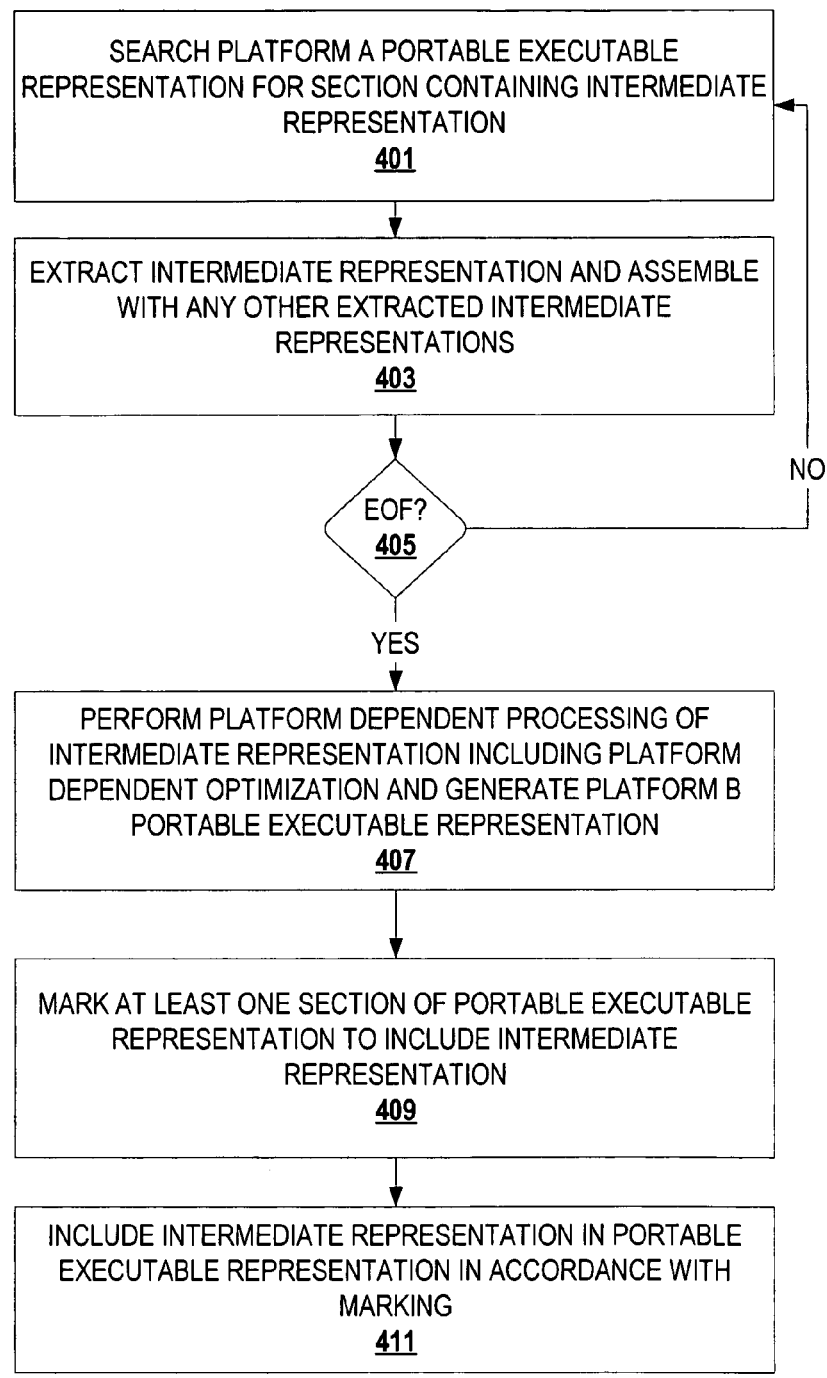
FIG. 4 depicts an exemplary flowchart for porting software across platforms.

FIG. 4 depicts an exemplary flowchart for porting software across platforms. At block 401, a portable executable representation of a source code for a platform A is searched for one or more sections containing an intermediate representation of the source code. At block 403, an intermediate representation is extracted and assembled with any other extracted intermediate representations of the source code. At block 405, it is determined if an end of file has been encountered. If an EOF has not been encountered, then control flows back to block 401. If an EOF has been encountered, then control flows to block 407. Realizations of the invention are not limited to locating embedded intermediate representations by sequentially searching an executable representation. For example, within the executable representation (e.g., in a header section) offsets for locating embedded intermediate representations may be indicated, information in a first located intermediate representation may include information for locating other embedded intermediate representations, etc.

At block 407, platform dependent processing of the intermediate representation is performed, and a platform B portable executable representation of the source code is generated from the intermediate representation. At block 409, at least one section of the newly generated portable executable representation is marked to include the intermediate representation. At block 411, the intermediate representation is embedded into the platform B portable executable representation in accordance with the marking(s).

Portable executable code allows a user to port their application to a new platform and/or different platform without the source code. Source code may be unavailable because a developer or application service provider has gone bankrupt, discontinues support for a product, etc. As a result, such techniques may provide a suitable alternative or complement to software escrow arrangements. A user can either port the application themselves with the executable representation of the source code and appropriate software tools, or request the developer or application service provider to port the application to a new and/or different platform. In addition, the entity supporting an application can efficiently migrate their application to newer platforms without having to recompile the source code. In addition, FIGS. 3 and 4 illustrate that portable executable representations can be utilized to port software with and without portability. Developers and/or application service providers may wish to designate certain parts of their code to not be modifiable. Hence, the developer indicates certain parts of the code cannot be changed (e.g., platform dependent optimizations cannot be made to certain sections of code).

Figure 5:
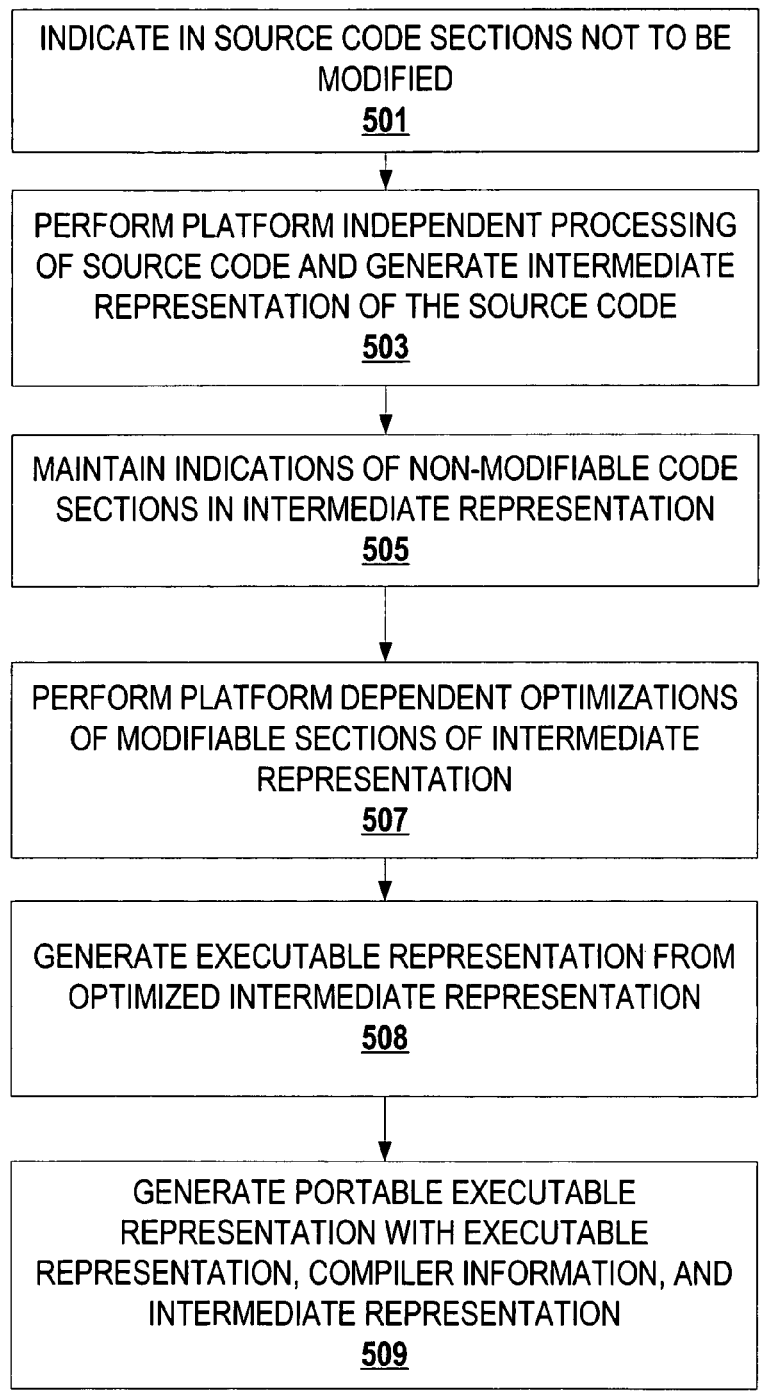
FIG. 5 depicts an exemplary flowchart for selective optimization of portable software.

FIG. 5 depicts an exemplary flowchart for selective optimization of portable software. At block 501, sections in source code not to be modified are indicated. These sections may not be modified for intellectual property reasons, proprietary reasons, efficiency reasons, etc. At block 503, platform independent processing of the source code is performed, and an intermediate representation of the source code is generated. At block 505, indication(s) of the non-modifiable section(s) is maintained in the intermediate representation. For example, codes or flags delimit the section or sections. At block 507, platform dependent optimizations of modifiable sections of the intermediate representation are performed. At block 508, an executable representation is generated from the optimized intermediate representation. At block 509, a portable executable representation is generated with the executable representation, compiler information, and the intermediate representation.

Figure 6:
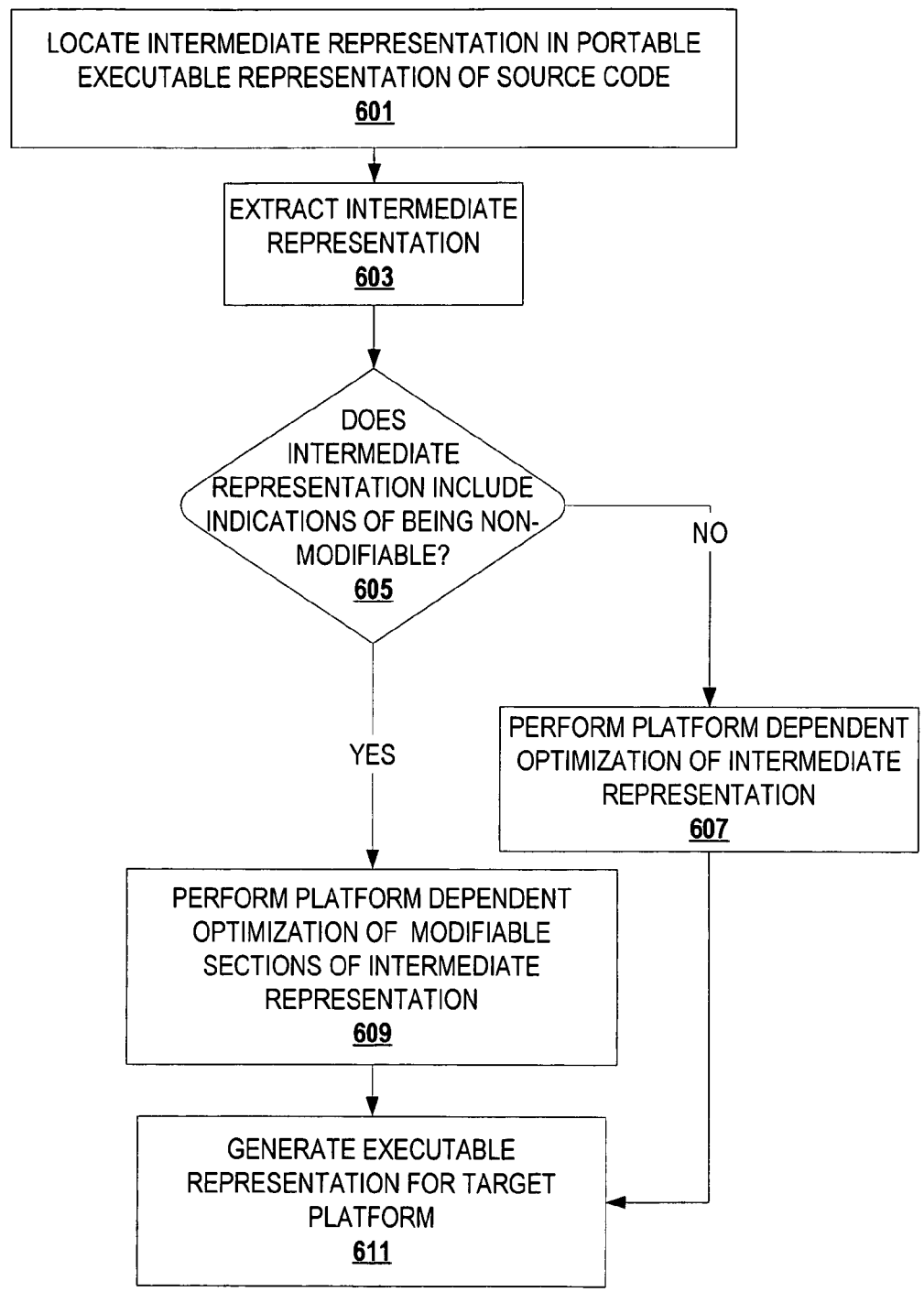
FIG. 6 depicts an exemplary flowchart for generating an executable source code representation from a portable executable source code representation with an intermediate source code representation with non-modifiable sections.

FIG. 6 depicts an exemplary flowchart for generating an executable source code representation from a portable executable source code representation with an intermediate source code representation with non-modifiable sections. At block 601, an intermediate representation of source code is located in a portable executable representation of the source code. At block 603, the intermediate representation is extracted from the portable executable representation of the source code. At block 605, it is determined if the extracted intermediate representation includes indications of non-modifiable sections. If the intermediate representation includes a non-modifiable section, then control flows to block 609. If the intermediate representation does not include a non-modifiable section, then control flows to block 607.

At block 607, platform dependent optimization is performed with the intermediate representation of the source code. Control flows from block 607 to block 611.

At block 609, platform dependent optimization is performed with modifiable sections of the intermediate representation. At block 611, an executable representation of the source code is generated for a target platform, which is different than the target platform of the executable representation of the portable executable representation.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, blocks 605, 607, and 609 may be performed incrementally as the intermediate representation is processed.

Figure 7A:
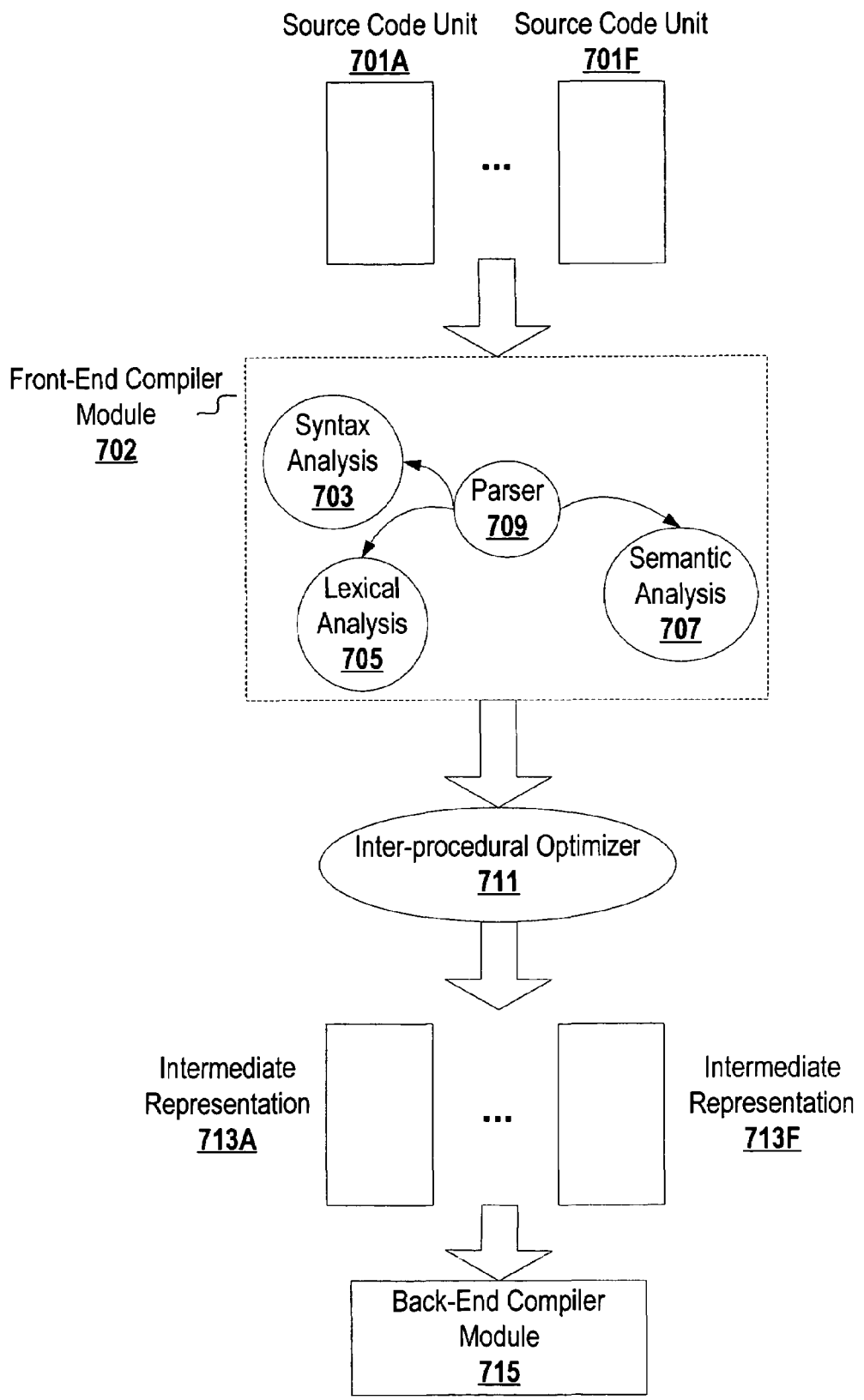
FIGS. 7A-7B depict preservation of an intermediate representation of source code in an exemplary environment.
Figure 7B:
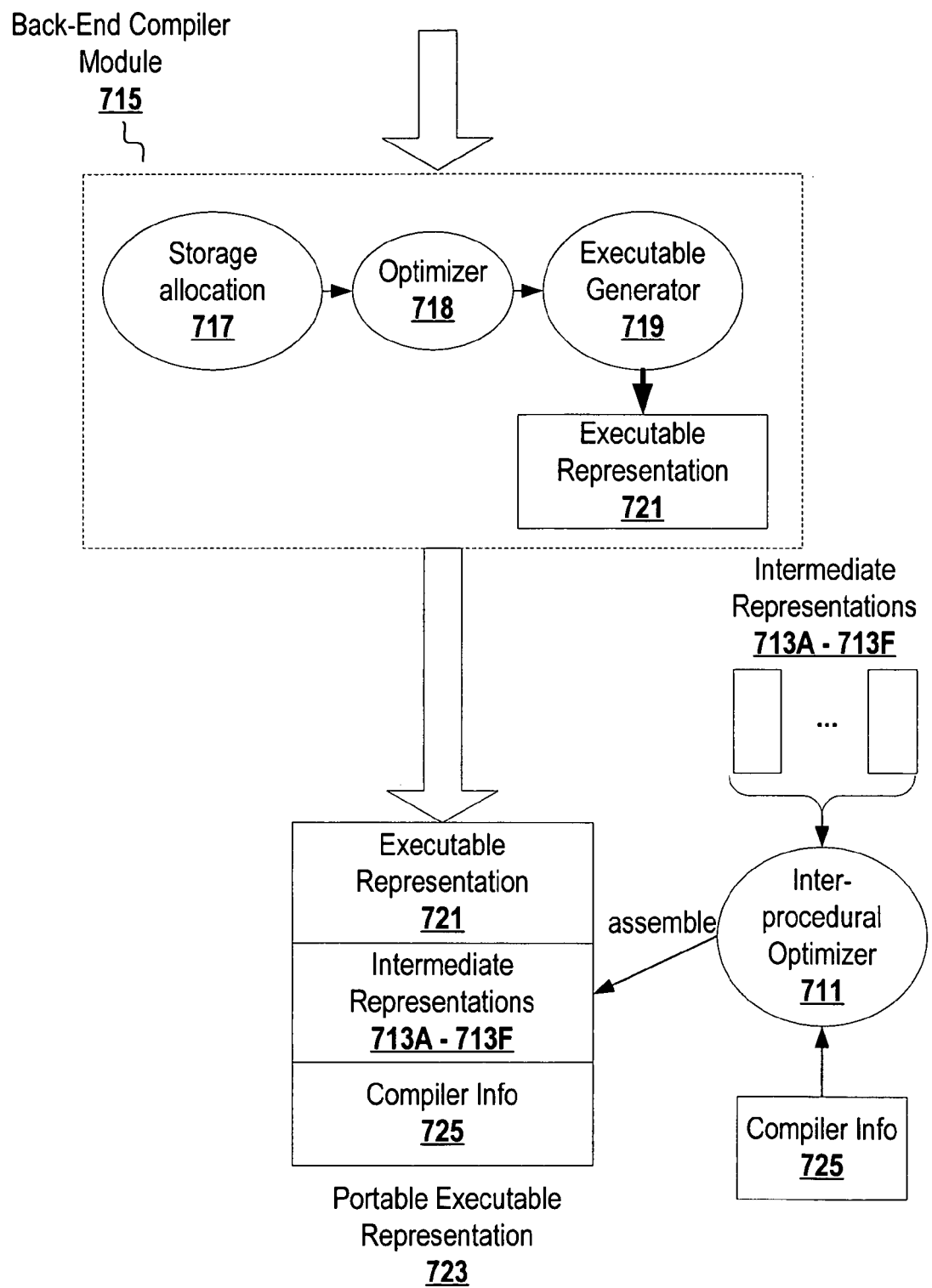

FIGS. 7A-7B depict preservation of an intermediate representation of source code in an exemplary environment. FIG. 7A depicts an exemplary compiler front-end module and interprocedural optimizer analyzing source code and generating intermediate representations of the source code. A compiler front-end module 702 processes source code units 701A-701F. The compiler front-end module 702 includes a parser 709, a syntax analysis module 703, a lexical analysis module 705, and a semantic analysis module 707. Various realizations of the invention implement the functionality of a front-end compiler differently (e.g., separate modules, implementing the lexical analysis module as a part of the syntax analysis module, etc.). The parser 709 parses the source code units 701A-701F and calls the modules 703, 705, and 707 when appropriate. After processing, the compiler front-end module 702 passes the processed source codes to an interprocedural optimizer 711. The interprocedural optimizer 711 coordinates information for multiple source code files to maximize optimization of the multiple source code files. A more detailed explanation of an exemplary interprocedural optimizer can be found in commonly-owned, co-pending U.S. patent application Ser. No. 09/895,445 entitled "Interprocedural Optimization Framework", filed on Jun. 29, 2001, naming Raj Prakash, Fu-Hwa Wang, and Chandrashekhar Garud as inventors, which is incorporated herein by reference in its entirety. Referring again to FIG. 7A, the interprocedural optimizer 711 generates intermediate representations 713A-713F of the source code units 701A-701F. The compiler back-end module 715 processes the intermediate representations 713A-713F. Various realizations of the invention determine the amount of space necessary for the portable executable representation that will host the intermediate representations and the executable representation to be included differently (e.g., the interprocedural optimizer communicates to the compiler back-end module the total size of the intermediate representations; the interprocedural optimizer communicates to the compiler back-end module the number of intermediate representations and respective sizes; identifiers of the intermediate representations and respective sizes are communicated; the compiler back-end module analyzes the intermediate representations to determine their individual sizes and total size; etc.). Furthermore, various realizations of the invention communicate the necessary space differently (e.g., a data structure(s) with references to location of the intermediate representations and their respective size information; including size information in headers of the intermediate representations; including the size information with the compiler information; etc.).

FIG. 7B depicts an exemplary interprocedural optimizer preserving intermediate representations of source code. The back-end compiler 715 includes a storage allocation module 717, an optimizer 718, and an executable generator 719. These modules perform platform dependent processing with the intermediate representations of the source code. The executable generator 719 generates an executable representation 721 of the source code units 701A-701F. The interprocedural optimizer 711 assembles the intermediate representations 713A-713F, the executable representation 721, and compiler information 725 into a portable executable representation 723. A single executable file, generated from multiple source code files, hosts one or more intermediate representations that can be utilized to port an application across platforms, without the inefficiencies of maintaining multiple files.

Figure 8A:
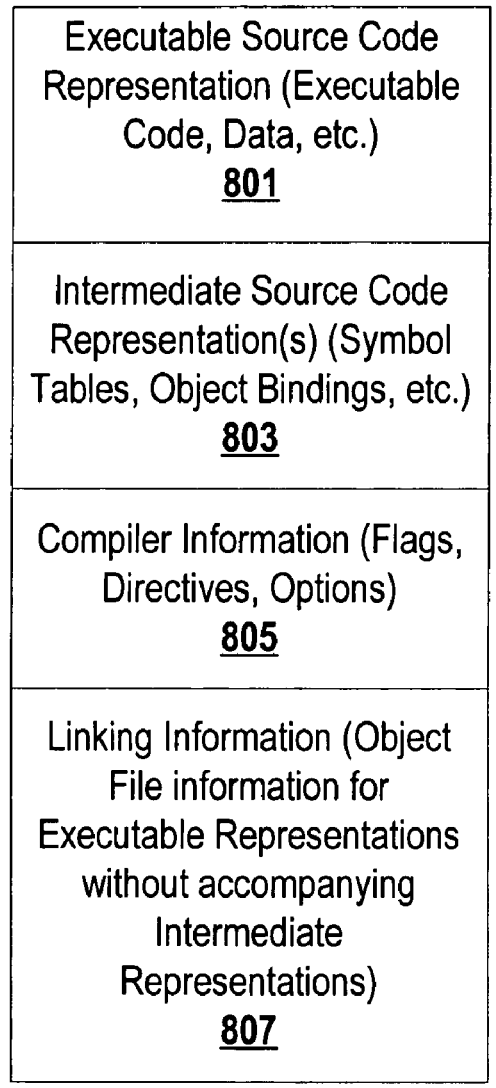
FIGS. 8A-8B depict a portable executable source code representation that allows re-linking to generate another executable source code representation.
Figure 8B:
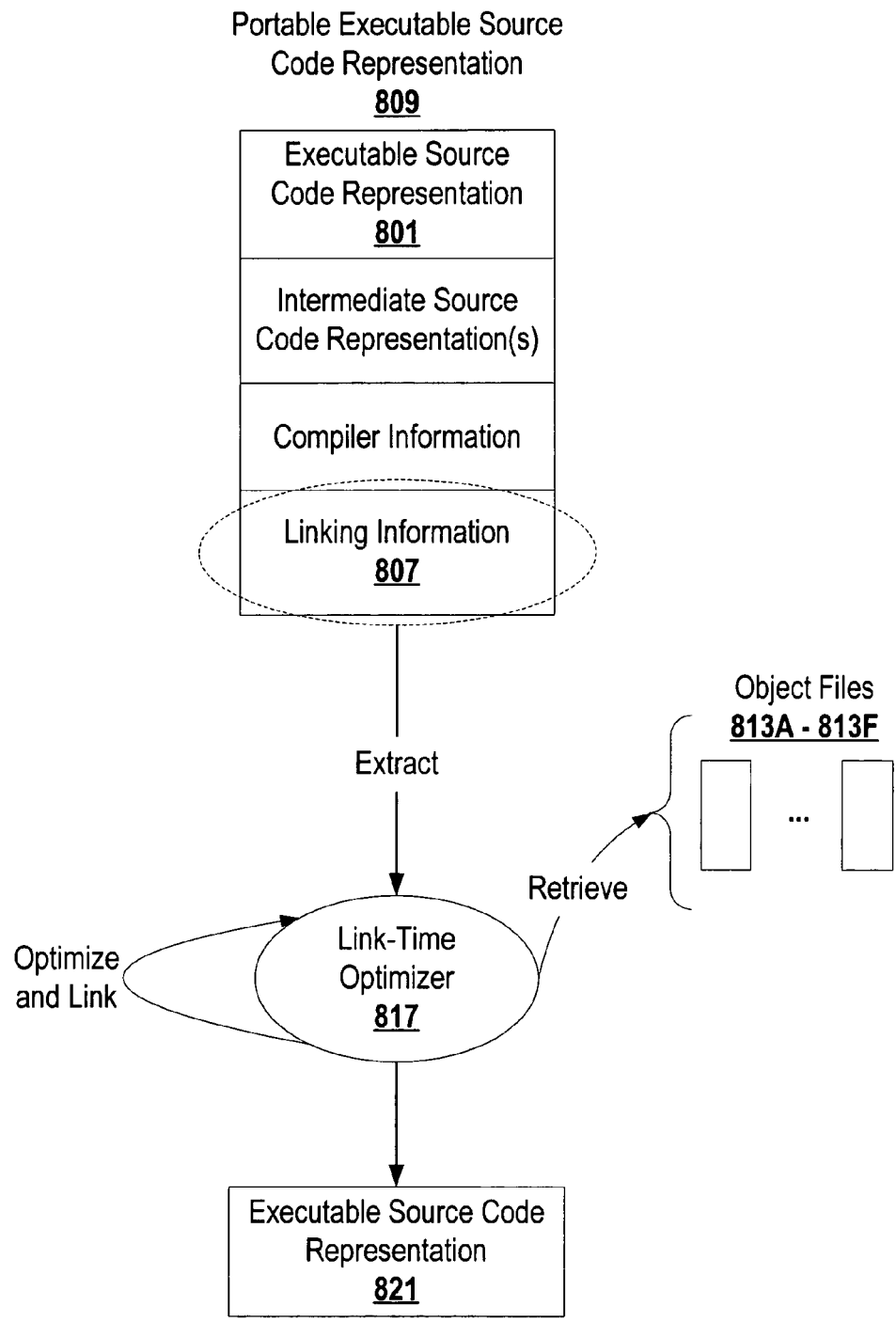

FIGS. 8A-8B depict a portable executable source code representation that allows re-linking to generate another executable source code representation. FIG. 8A depicts an exemplary portable executable source code representation. A portable executable source code representation 809 includes executable source code representation 801, intermediate source code representation 803, compiler information 805, and linking information 807. The executable source code representation 801 includes executable code, data, etc. The intermediate source code representation 803 includes object bindings, symbol tables, etc., similar to the intermediate source code representation 133 of FIG. 1B. The compiler information 805 may include compiler flags, directives, options, etc. The linking information 807 includes information that allows files to be re-linked. For example, linking information 807 includes object file information. The object file information can be utilized to re-link object files to generate an executable source code representation.

FIG. 8B depicts exemplary re-linking of object files with a portable executable source code representation. A link-time optimizer 817 extracts linking information 807 from the portable executable source code representation 809. A link-time optimizer, among other things, can rearrange instructions to improve instruction cache behavior. The link-time optimizer 817 processes the linking information 807 and retrieves object files 813A-813F. The link-time optimizer 817 optimizes and links the object files 813A-813F, and generates an executable source code representation 821. The executable source code representation 821 may be different from the executable source code representation 801 in a number of different ways, despite deriving from the same or substantially similar source code. For example, the executable source code representation 801 and 821 may be for different platforms, may be optimized differently, etc. Hence, without the source code and with a portable executable source code representation, intermediate files (e.g., object code files), which are not accompanied with intermediate source code representation(s), can be optimized and re-linked to generate another executable source code representation.

The described invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 9:
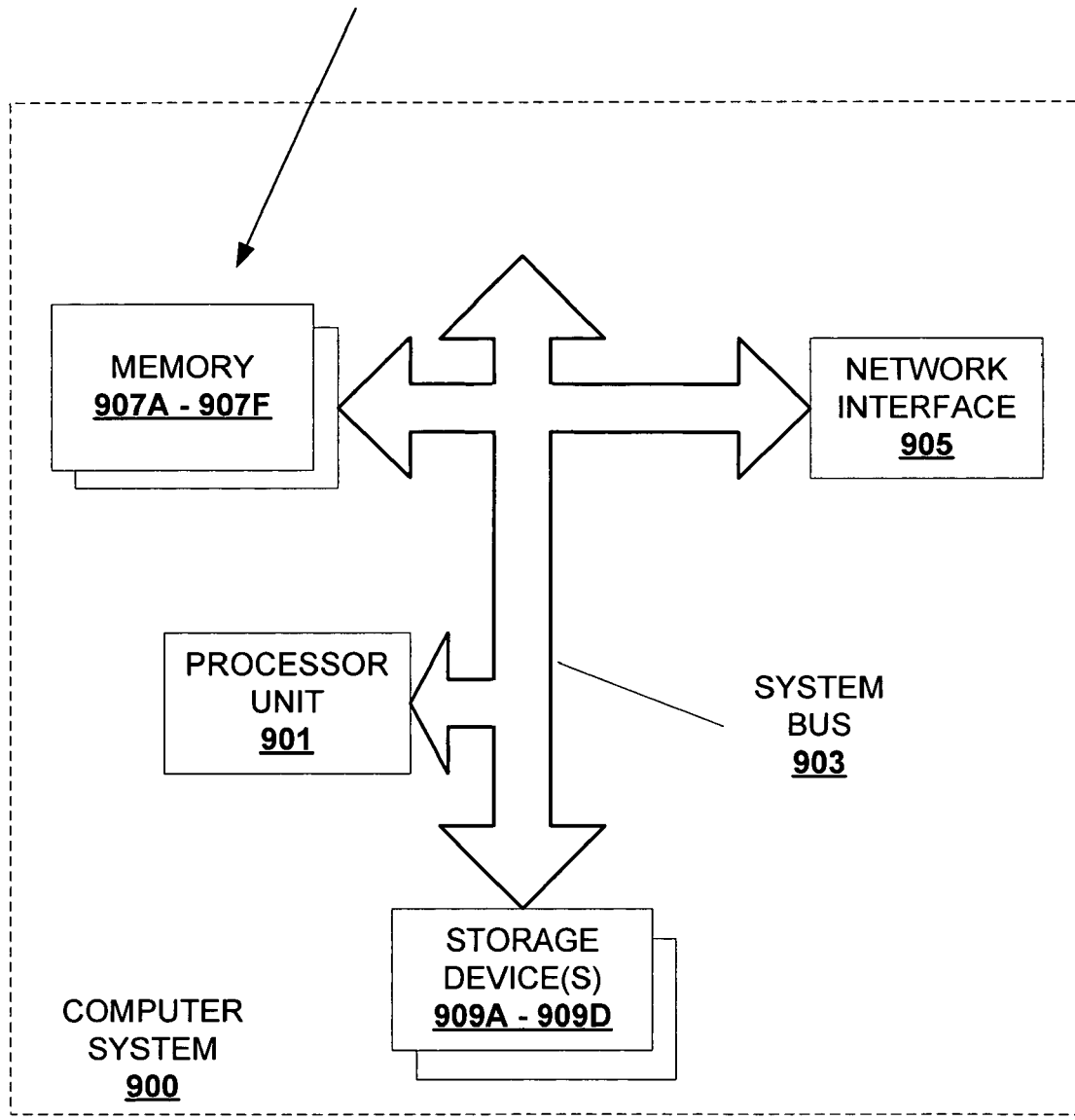
FIG. 9 depicts an exemplary computer system according to some realizations of the invention.

FIG. 9 depicts an exemplary computer system according to some realizations of the invention. A computer system 900 includes a processor unit 901 (possibly including multiple processors). The computer system 900 also includes memory 907A-907F (e.g., one or more of cache, SRAM DRAM, RDRAM, EDO RAM, DDR RAM, EEPROM, Flash memory, etc.), a system bus 903 (e.g., LDT, PCI, ISA, etc.), a network interface 905 (e.g., an ATM interface, an Ethernet interface, a Frame Relay interface, etc.), and a storage device(s) 909A-909D (e.g., optical storage, magnetic storage, etc.). Realizations of the invention may include fewer or additional components not illustrated in FIG. 9 (e.g., video cards, audio cards, additional network interfaces, peripheral devices, etc.). The processor unit 901, the storage device(s) 909A-909D, the network interface 905, and the system memory 907A-907F are coupled to the system bus 903. One or more of the storage devices 909A-909D may host the software portability tool described in FIG. 3; the memory 907A-907F depicted in FIG. 9 may embody the software portability tool; etc. In addition, the interprocedural optimizer may be embodied in one or more of the memory 907A-907F, hosted in one or more of the storage devices 909A-909D, etc.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A tangible machine-readable medium comprising a software tool, the software tool comprising:
    portability code to include an intermediate representation of source code with an executable representation of the source code, wherein the intermediate representation of the source code includes information sufficient for generating another executable representation of the source code.

2. The software tool of claim 1, further comprising the portability code to include source code processing information with the intermediate source code representation and the executable source code representation.

3. The software tool of claim 2, wherein the source code processing information includes one or more of compiler directives, compiler options, compiler flags, virtual machine options, and source code processing invocation commands.

4. The software tool of claim 1, wherein the executable source code representation at least includes executable code.

5. The software tool of claim 1, wherein the intermediate representation includes one or more of linking information, symbol tables, object bindings, and platform independent optimization information.

6. The software tool of claim 1, wherein a compiler allots sufficient space for the executable representation and for the intermediate representation as a portable executable source code representation.

7. The software tool of claim 1, further comprising platform independent processing code to perform platform independent processing of the source code and to generate the intermediate representation of the source code.

8. The software tool of claim 7, wherein the platform independent processing includes one or more of lexical analysis, syntax analysis, platform independent optimization, and semantic analysis.

9. The software tool of claim 1, wherein the software tool uses the intermediate source code representation to generate a second executable representation of the source code.

10. The software tool of claim 9, wherein the second executable source code representation is for a different one or more of platform and operating environment than the executable source code representation.

11. The software tool of claim 9, further comprising preservation code to prohibit modifying optimizations of the intermediate representation.

12. The software tool of claim 1, wherein the software tool includes one or more of a compiler front-end, a compiler back-end, an interprocedural optimizer, an interpreter, and a linker.

13. The software tool of claim 1, further comprising the portability code to include linking information with the executable source code representation and the intermediate source code representation.

14. The software tool of claim 13, wherein the linking information includes object file information.

15. The software tool of claim 13, further comprising a link-time optimizer to re-link object files corresponding to the source code in accordance with the linking information.

16. A method comprising:
including an intermediate representation of source code with an executable representation of the source code, wherein the executable source code representation at least includes executable code and the intermediate source code representation is generated from platform independent processing of the source code; and
indicating the intermediate source code representation relative to the executable source code representation, wherein the intermediate source code representation is providable for generation of one or more other executable representations of the source code.

17. The method of claim 16 further comprising including source code processing command information in the portable executable source code representation.

18. The method of claim 17, wherein the source code processing command information includes one or more of compiler directives, compiler flags, compiler options, and virtual machine options.

19. The method of claim 16, wherein the intermediate representation includes one or more of linking information, symbol tables, object bindings, and optimization information.

20. The method of claim 16 further comprising performing the platform independent processing of the source code to generate the intermediate source code representation.

21. The method of claim 20, wherein platform independent processing includes one or more of lexical analysis, syntax analysis, platform independent optimization, and semantic analysis.

22. The method of claim 16 further comprising generating a portable executable file and allocating space sufficient to accommodate the executable source code representation and the intermediate source code representation.

23. The method of claim 22 further comprising:
extracting the intermediate representation from the portable executable file; and
supplying the extracted intermediate representation for generation of a second executable representation, wherein the second executable representation and the executable representation undergo different platform dependent processing.

24. The method of claim 23, wherein the platform dependent processing includes one or more of storage allocation and executable code generation.

25. The method of claim 16 further comprising including a second intermediate representation of the source code with the executable source code representation, wherein the second intermediate representation of the source code is providable with the intermediate representation of the source code for generation of the second executable representation of the source code, wherein the intermediate representation is generated from a first unit of the source code and the second intermediate representation is generated from a second unit of the source code.

26. The method of claim 16 embodied as a computer program product encoded on one or more tangible machine-readable media.

27. A method comprising:
using an intermediate representation of a first source code included with a first executable representation of the first source code and an indication of source code processing command information that corresponds to the intermediate representation; and
generating a second executable representation of the first source code with the intermediate representation of the first source code, wherein the first and second executable representations are respectively for a first and a second platforms.

28. The method of claim 27 further comprising:
linking a second source code's representation with the second executable representation.

29. The method of claim 28 wherein the second source code's representation includes one or more of an intermediate representation of the second source code and an executable representation of the second source code.

30. The method of claim 28 wherein the second source code's representation includes a library.

31. The method of claim 28 further comprising:
including linking information that corresponds to the first and second source codes.

32. The method of claim 27 further comprising including the intermediate representation with the first executable representation.

33. The method of claim 27 further comprising performing optimizations on sections of the intermediate representation that are not indicated as non-modifiable.

34. The method of claim 27 embodied as a computer program product encoding on one or more tangible machine-readable media.

35. A computer program product encoded in one or more tangible machine-readable media, wherein the computer program product comprises:
   a first sequence of instructions operable to store source code processing command that corresponds to generation of an intermediate representation of a source code; and
   a second sequence of instructions operable to include the intermediate source code representation and the stored source code processing command information with an executable representation of the source code.

36. The computer program product of claim 35, wherein the executable source code representation includes executable code and data.

37. The computer program product of claim 35 further comprising a third sequence of instructions operable to determine sufficient space for the intermediate source code representation, the source code processing command information, and the executable source code representation, and operable to supply indication of the sufficient space.

38. The computer program product of claim 35 further comprising a third sequence of instructions operable to generate a second executable representation from the intermediate representation.

39. The computer program product of claim 35 further comprising a third sequence of instructions operable to mark sections of source code to prevent optimizations inconsistent with the source code and to carry forward those markings into the intermediate representation of the source code.

40. The computer program product of claim 35 further comprising a third sequence of instructions operable to perform platform independent processing of the source code to generate the intermediate representation of the source code.

41. The computer program product of claim 40, wherein platform independent processing of the source code includes one or more of lexical analysis, semantic analysis, syntax analysis, and platform independent optimizations.

42. A computer program product encoded in one or more tangible machine-readable media, wherein the computer program product comprises:
   a first sequence of instructions operable to locate a source code's intermediate representation that is included with a first executable representation of the source code; and
   a second sequence of instructions operable to utilize the intermediate representation for generation of a second executable representation of the source code.

43. The computer program product of claim 42 further comprising:
   the first sequence of instructions operable to locate source code processing command information; and
   the second sequence of instructions operable to utilize the source code processing command information and the intermediate representation for said generation of the second executable representation of the source code.

44. The computer program product of claim 42, wherein generation of the second executable representation comprises performing platform dependent processing.

45. The computer program product of claim 44 further comprising a third sequence of instructions operable to perform the platform dependent processing.

46. The computer program product of claim 44, wherein the platform dependent processing includes one or more of storage allocation, platform dependent optimizations, and target platform code generation.

47. The computer program product of claim 42 further comprising a third sequence of instructions operable to include a source code's intermediate representation with an executable representation of the source code.

48. The computer program product of claim 47, wherein the third sequence of instructions are further operable to include source code processing command information with a source code's intermediate representation with an executable representation of the source code.

49. An apparatus comprising:
   means for translating source code; and
   means for including one or more intermediate representations of source code with an executable representation of the source code.

50. The apparatus of claim 49 further comprising means for including source code processing command information with intermediate source code representations and an executable source code representation.

51. The apparatus of claim 49 further comprising means for preventing code optimizations that are inconsistent with the source code.

52. The apparatus of claim 49 wherein the intermediate representations include one or more of platform independent optimizations, symbol tables, and object bindings.

53. The apparatus of claim 49 further comprising means for utilizing one or more intermediate representations of source code that accompany a first executable representation of the source code and for generating a second executable representation of the source code with the intermediate representations.

54. An apparatus comprising:
   means for extracting one or more intermediate representations of source code from a portable executable file, wherein the portable executable file includes a first executable representation of the source code along with the intermediate representations of the source code; and
   means for generating a second executable representation of the source code with the extracted intermediate representation.

55. The apparatus of claim 54 further comprising means for including intermediate representations of source code with an executable representation of the source code in a portable executable file.

56. The apparatus of claim 54 wherein the first executable representation and the second executable representation are for a respective first platform and second platform.

57. A tangible machine-readable medium encoding comprising:
   a portable executable representation of source code, wherein the portable executable representation includes, one or more intermediate representations of the source code, an executable representation of the source code, and source code processing command information.

58. The tangible machine-readable medium encoding of claim 57, wherein the intermediate representations include one or more of object bindings, platform dependent optimizations, and symbol tables.

59. The tangible machine-readable medium encoding of claim 57, wherein the executable representation of the source code includes executable code and data.

60. The tangible machine-readable medium encoding of claim 57, wherein the source code processing command information includes one or more of compiler options, compiler directives, and compiler flags.

* * * * *